US006983133B2

(12) United States Patent
Park (10) Patent No.: US 6,983,133 B2
(45) Date of Patent: Jan. 3, 2006

(54) LINEARIZATION APPARATUS FOR LINEAR AUTOMATIC GAIN CONTROL IN A MOBILE COMMUNICATION TERMINAL AND METHOD FOR CONTROLLING THE SAME

(75) Inventor: Hung-Su Park, Seoul (KR)

(73) Assignee: Samsung Electronics Co., Ltd., (KR)

( * ) Notice: Subject to any disclaimer, the term of this patent is extended or adjusted under 35 U.S.C. 154(b) by 492 days.

(21) Appl. No.: 10/314,093

(22) Filed: Dec. 6, 2002

(65) Prior Publication Data

US 2003/0124997 A1    Jul. 3, 2003

(30) Foreign Application Priority Data

Dec. 6, 2001    (KR)    ............... 10-2001-0076812

(51) Int. Cl.
*H04B 1/04*    (2006.01)
*H01Q 11/12*    (2006.01)
(52) U.S. Cl. .................... 455/127.2; 455/234.2
(58) Field of Classification Search ............ 455/550.1, 455/127.2, 127.1, 232.1, 234.1, 234.2, 250.1; 375/345; 330/278
See application file for complete search history.

(56) References Cited

U.S. PATENT DOCUMENTS 5,627,857 A * 5/1997 Wilson ................ 375/219

5,999,718 A * 12/1999 Wang et al. ............ 703/2

* cited by examiner

Primary Examiner—Nguyen T. Vo
(74) Attorney, Agent, or Firm—Dilworth & Barrese LLP (57) ABSTRACT

Disclosed is a linearization method in a mobile communication terminal wherein automatic gain control signals are divided into a plurality of entry regions, and which includes an initial value for a first entry region among the plurality of entry regions, a resolution constant and a slope character value for each entry region for generating a linear automatic gain control signal which guarantee a linearity of amplification gain of an amplifier. The linearization method comprises the steps of: detecting a corresponding entry region using a preset number of bits from the automatic gain control signal which is represented by a plurality of bits and detecting a position value of the detected entry region using the remaining bits except the preset number of bits; generating an initial value of a second entry region using the initial value of the first entry region, an entry region size value and a slope value of the first entry region presented by the resolution constant and a slope character value of the first entry region, and then sequentially generating initial values of the following entry regions using an initial value of a previous entry region, the entry region size value, a slope value of a previous entry region to thereby generate an initial value of the detected entry region; and generating the linear automatic gain control signal by adding a value obtained by multiplying the slope value of the detected entry region by the position value of the entry region and an initial value of a corresponding entry region which is generated by the initial value generator.

12 Claims, 4 Drawing Sheets

LINEARIZATION APPARATUS FOR LINEAR AUTOMATIC GAIN CONTROL IN A MOBILE COMMUNICATION TERMINAL AND METHOD FOR CONTROLLING THE SAME

PRIORITY

This application claims priority to an application entitled "Linearization Apparatus for Linear Automatic Gain Control in a Mobile Communication Terminal and Method for Controlling the Same" filed in the Korean Industrial Property Office on Dec. 6, 2001 and assigned Ser. No. 2001-76812, the contents of which are hereby incorporated by reference.

BACKGROUND OF THE INVENTION

1. Field of the Invention

The present invention relates generally to a mobile communication terminal, and in particular, to a linearization apparatus and method for linear automatic gain control.

2. Description of the Related Art

A mobile communication terminal includes a transceiver for processing RF (Radio Frequency) signals, and a variable gain amplifier for varying a gain of the RF signals transmitted and received through the transceiver according to a gain control signal provided from a microprocessor, or a main controller. A technique for variably controlling a gain of the RF transmission/reception signals according to the gain control signal by the variable gain amplifier is called an "automatic gain control (AGC)" technique. An internal structure of a transceiver in a mobile communication terminal supporting the automatic gain control technique will be described with reference to FIG. 1.

Figure 1:
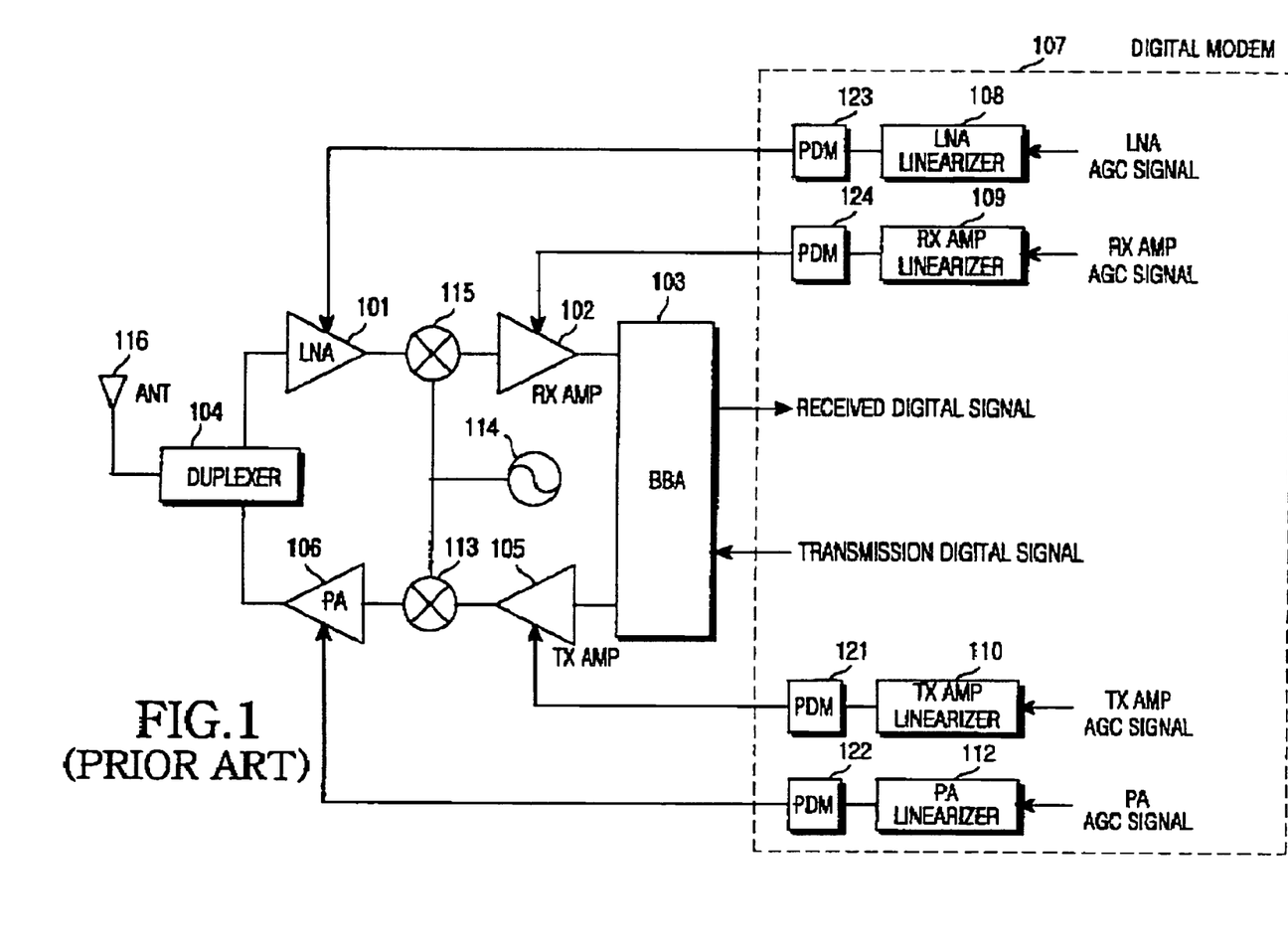
FIG. 1 is a block diagram illustrating an internal structure of a transceiver in a general mobile communication terminal with a linearization apparatus for linear automatic gain control.

FIG. 1 is a block diagram illustrating an internal structure of a transceiver in a general mobile communication terminal with a linearization apparatus for linear automatic gain control.

First, a structure of a transmitter in the mobile communication terminal will be described with reference to FIG. 1. In the mobile communication terminal, if a transmission signal (digital signal) to be transmitted over the air is generated, the digital transmission signal is applied to a base band analog (BBA) processor 103. The BBA processor 103 converts the received digital transmission signal into an IF (Intermediate Frequency) analog signal, and provides the converted IF analog signal to a transmission amplifier (TX AMP) 105. The transmission amplifier 105 amplifies the IF analog signal provided from the BBA processor 103 at a gain controlled by an automatic gain control signal, and provides its output to a transmission mixer 113.

However, the transmission amplifier 105 has a nonlinear gain characteristic. That is, in the case where a level of an input signal applied to the transmission amplifier 105 is fixed, although a level of an automatic gain control signal applied to the transmission amplifier 105 is linearly increased, a level of an output signal from the transmission amplifier 105 is not linearly increased. This is because the transmission amplifier 105 typically does not have a true linear gain characteristic. Of course, if an amplifier having a good linear gain characteristic is used, the transmission amplifier 105 can linearly amplify an input signal according to the linear automatic gain control signal. However, the amplifier having a good linear gain characteristic is expensive, causing an increase in the unit cost of the mobile communication terminal. Thus, such an amplifier is not generally used in the mobile communication terminal. To solve this problem, a transmission amplifier linearizer 110 first alters an automatic gain control signal applied to the transmission amplifier 105, and the transmission amplifier 105 amplifies an input signal according to the altered automatic control signal, thereby securing linearity of an output signal versus an input signal. Thus, the transmission amplifier 105 undergoes linear automatic gain control.

Linear automatic gain control on the transmission amplifier 105 is performed by the transmission amplifier linearizer 110. A detailed description of the transmission amplifier linearizer 110 will be made herein below.

A main controller (not shown) of the mobile communication terminal provides a transmission amplifier automatic gain control signal (TX_AMP_AGC) to the transmission amplifier linearizer 110, when a digital transmission signal is generated. The transmission amplifier automatic gain control signal is generated according to a power level of the digital transmission signal. That is, in order to secure the linearity of an output signal from the transmission amplifier 105, the transmission amplifier automatic gain control signal is altered by the transmission amplifier linearizer 110. Herein, the transmission amplifier automatic gain control signal generated from the transmission amplifier linearizer 110 will be referred to as a "first linear automatic gain control signal." That is, the first linear automatic gain control signal is intentionally altered to secure linearity of the transmission amplifier 105 with respect to the IF analog signal output from the BBA processor 103. The first linear automatic gain control signal generated by the transmission amplifier linearizer 110 is provided to a PDM (Pulse Duration Modulation) modulator 121, and the PDM modulator 121 PDM-modulates the first linear automatic gain control signal and provides its output to the transmission amplifier 105.

The transmission amplifier 105 then amplifies the IF transmission signal output from the BBA processor 103 according to the first linear automatic gain control signal, and provides its output to a transmission mixer 113. The transmission mixer 113 multiplies the output signal of the transmission amplifier 105 by a frequency generated from an oscillator 114, and provides its output to a power amplifier (PA) 106. Here, the transmission mixer 113 frequency-up-converts the IF transmission signal into an RF transmission signal which can be transmitted over the air. The power amplifier 106 amplifies the output signal of the transmission mixer 113 at a preset gain, and provides its output to a duplexer 104.

However, the power amplifier 106 also has a nonlinear gain characteristic, so it cannot linearly amplify its input signal according to an automatic gain control signal applied thereto. That is, although a level of an automatic gain control signal applied to the power amplifier 106 is linearly changed, a level of an output signal from the power amplifier 106 is not linearly changed. This is because the power amplifier 106 also typically does not have a true linear gain characteristic. Of course, if an amplifier having a good linear gain characteristic is used, the power amplifier 106 can linearly amplify an input signal according to the automatic gain control signal. However, the amplifier having a good linear gain characteristic is expensive, causing an increase in the unit cost of the mobile communication terminal. Thus, such an amplifier is not generally used in the mobile communication terminal. To solve this problem, a power amplifier linearizer 112 first alters an automatic gain control signal applied to the power amplifier 106, and the power amplifier 106 amplifies an input signal according to the altered automatic control signal, thereby securing linearity of an output signal versus an input signal. Thus, the power amplifier 106 undergoes linear automatic gain control.

Linear automatic gain control on the power amplifier 106 is performed by the power amplifier linearizer 112. A detailed description of the power amplifier linearizer 112 will be made herein below.

The main controller of the mobile communication terminal provides a power amplifier automatic gain control signal (PA_AGC) to the power amplifier linearizer 112, when a signal is applied to the power amplifier 106. The power amplifier automatic gain control signal is generated according to a power level of a signal received from the transmission mixer 113. That is, in order to secure the linearity of an output signal from the power amplifier 106, the power amplifier automatic gain control signal is altered by the power amplifier linearizer 112. Herein, the power amplifier automatic gain control signal generated from the power amplifier linearizer 112 will be referred to as a "second linear automatic gain control signal." That is, the second linear automatic gain control signal is intentionally altered to secure linearity of the power amplifier 106 with respect to the output signal of the transmission mixer 113. The second linear automatic gain control signal generated by the power amplifier linearizer 112 is provided to a PDM modulator 122, and the PDM modulator 122 PDM-modulates the second linear automatic gain control signal and provides its output to the power amplifier 106.

The power amplifier 106 then amplifies the RF transmission signal output from the transmission mixer 113 at a gain controlled by the second linear automatic gain control signal, and provides its output to the duplexer 104. The duplexer 104 duplexes the output signal of the power amplifier 106 and transmits the duplexed signal over the air through an antenna 116.

Next, a structure of a receiver in the mobile communication terminal will be described with reference to FIG. 1. An RF signal received from the air through the antenna 116 is provided to the duplexer 104. The duplexer 104 duplexes the RF signal provided from the antenna 116 and provides the duplexed RF signal to a low noise amplifier (LNA) 101. The low noise amplifier 101 LNA-amplifies the output signal of the duplexer 104 at a preset gain, and provides the LNA-amplified signal to a reception mixer 115.

However, the low noise amplifier 101 also has a nonlinear gain characteristic. That is, although a level of an automatic gain control signal applied to the low noise amplifier 101 is linearly increased, a level of an output signal from the low noise amplifier 101 is not linearly increased. This is because the low noise amplifier 101 generally does not have a true linear gain characteristic. Of course, if an amplifier having a good linear gain characteristic is used, the low noise amplifier 101 can linearly amplify an input signal according to the automatic gain control signal. However, amplifiers having good linear gain characteristic are expensive, causing an increase in the unit cost of the mobile communication terminal. Thus, such an amplifier is generally not used in the mobile communication terminal. To solve this problem, a low noise amplifier linearizer 108 first alters distorts an automatic gain control signal applied to the low noise amplifier 101, and the low noise amplifier 101 amplifies an input signal according to the altered automatic control signal, thereby securing linearity of an output signal versus an input signal. Thus, the low noise amplifier 101 undergoes linear automatic gain control.

Linear automatic gain control on the low noise amplifier 101 is performed by the low noise amplifier linearizer 108. A detailed description of the low noise amplifier linearizer 108 will be made herein below.

The main controller of the mobile communication terminal provides a low noise amplifier automatic gain control signal (LNA_AMP_AGC) to the low noise amplifier linearizer 108, when it perceives that a signal is applied to the low noise amplifier 101. The low noise amplifier automatic gain control signal is generated according to a power level of the signal applied to the low noise amplifier 101. That is, in order to secure the linearity of an output signal from the low noise amplifier 101, the low noise amplifier automatic gain control signal is first altered by the low noise amplifier linearizer 108. Herein, the low noise amplifier automatic gain control signal generated from the low noise amplifier linearizer 108 will be referred to as a "third linear automatic gain control signal." That is, the third linear automatic gain control signal is intentionally altered to secure linearity of the low noise amplifier 101 with respect to the signal applied from the duplexer 104 to the low noise amplifier 101. The third linear automatic gain control signal generated by the low noise amplifier linearizer 108 is provided to a PDM modulator 123, and the PDM modulator 123 PDM-modulates the third linear automatic gain control signal and provides its output to the low noise amplifier 101.

The low noise amplifier 101 then amplifies the output signal of the duplexer 104 according to the third linear automatic gain control signal, and provides its output to a reception mixer 115. The reception mixer 115 multiplies the output signal of the low noise amplifier 101 by a frequency generated from an oscillator 114, and provides its output to a reception amplifier (RX AMP) 102. Here, the reception mixer 115 frequency-down-converts the received RF signal into an IF signal. The reception amplifier 102 amplifies the output signal of the reception mixer 115 at a preset gain, and provides its output to the BBA processor 103.

However, the reception amplifier 102 also has a nonlinear gain characteristic. That is, although a level of an automatic gain control signal applied to the reception amplifier 102 is linearly increased, a level of an output signal from the reception amplifier 102 is not linearly increased. This is because the reception amplifier 102 generally does not have a true linear gain characteristic. Of course, if an amplifier having a good linear gain characteristic is used, the reception amplifier 102 can linearly amplify an input signal according to the automatic gain control signal applied thereto. However, the amplifier having a good linear gain characteristic is expensive, causing an increase in the unit cost of the mobile communication terminal. Thus, such an amplifier is not generally used in the mobile communication terminal. To solve this problem, a reception amplifier linearizer 109 first alters an automatic gain control signal applied to the reception amplifier 102, and the reception amplifier 102 amplifies an input signal according to the altered automatic control signal, thereby securing linearity of an output signal versus an input signal. Thus, the reception amplifier 102 undergoes linear automatic gain control.

Linear automatic gain control on the reception amplifier 102 is performed by the reception amplifier linearizer 109. A detailed description of the reception amplifier linearizer 109 will be made herein below.

The main controller of the mobile communication terminal provides a reception amplifier automatic gain control signal (RX_AMP_AGC) to the reception amplifier linearizer 109, when it perceives that a signal is applied to the reception amplifier 102. The reception amplifier automatic gain control signal is generated according to a power level of the signal applied to the reception amplifier 102. That is, in order to secure the linearity of an output signal from the reception amplifier 102, the reception amplifier automatic gain control signal is first altered by the reception amplifier linearizer 109. Herein, the reception amplifier automatic gain control signal generated from the reception amplifier linearizer 109 will be referred to as a "fourth linear automatic gain control signal." That is, the fourth linear automatic gain control signal is intentionally altered to secure linearity of the reception amplifier 102 with respect to the signal applied from the reception mixer 115 to the reception amplifier 102. The fourth linear automatic gain control signal generated by the reception amplifier linearizer 109 is provided to a PDM modulator 124, and the PDM modulator 124 PDM-modulates the fourth linear automatic gain control signal and provides its output to the reception amplifier 102.

The reception amplifier 102 then amplifies the output signal of the reception mixer 115 according to the fourth linear automatic gain control signal, and provides its output to the BBA processor 103. The BBA processor 103 converts the analog output signal of the reception amplifier 102 into a digital signal.

In practice, the PDM modulators 121, 122, 123 and 124, and their associated linearizers 110, 112, 108 and 109 are implemented in a single digital modem 107. In addition, the transmission amplifier linearizer 110, the power amplifier linearizer 112, the low noise amplifier linearizer 108 and the reception amplifier linearizer 109 are implemented with a single digital predistortion linearizer.

In the transceiver of the mobile communication terminal with a linearization apparatus illustrated in FIG. 1, the transmission amplifier linearizer 110, the power amplifier linearizer 112, the low noise amplifier linearizer 108 and the reception amplifier linearizer 109 are all identical to one another in structure except the input automatic gain control signals and the altered automatic gain control signals. A detailed structure of the linearizers will be described with reference to FIG. 2.

Figure 2:
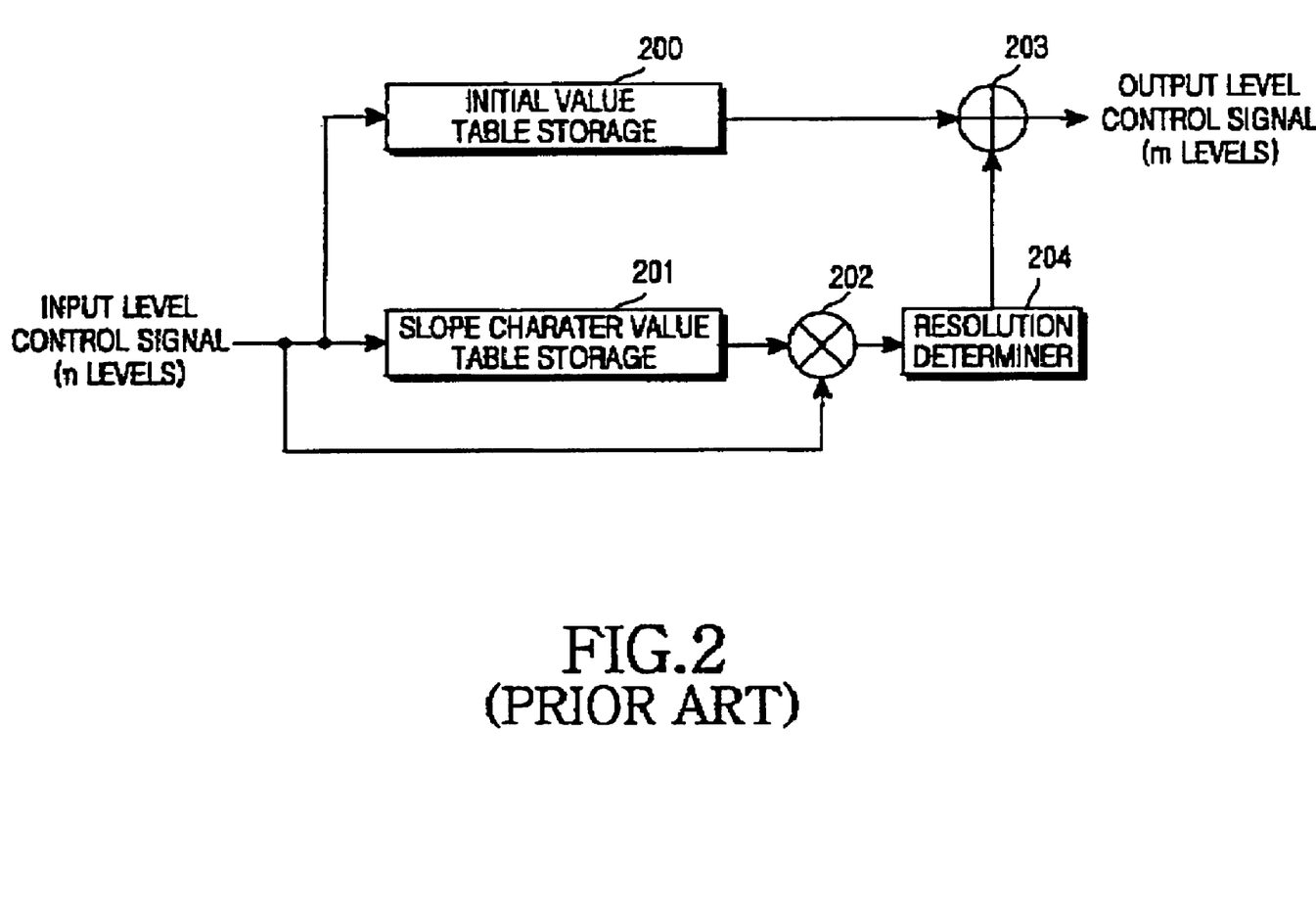
FIG. 2 is a block diagram illustrating a detailed structure of a general linearization apparatus for linear automatic gain control.

FIG. 2 is a block diagram illustrating a detailed structure of a general linearization apparatus for linear automatic gain control. Before a description of FIG. 2, it should be noted that the transmission amplifier linearizer 110, the power amplifier linearizer 112, the low noise amplifier linearizer 108 and the reception amplifier linearizer 109 each can be implemented with a lookup table. Here, the "lookup table" refers to a table in which n entries each corresponding to n input levels of the input automatic gain control signal applied to the linearizer are provided, and then preset output levels each corresponding to the n entries are stored. However, since the linearization apparatus, when implemented with the lookup table, will have n entries each corresponding to the n input levels, it requires an additional memory for storing the lookup table. An increase in the memory hinders a reduction in size and cost of the mobile communication terminal. Therefore, instead of providing the n entries each corresponding to the n input levels, the linearization apparatus of FIG. 2 divides the n input levels into k regions and provides k entries each corresponding to the k regions.

The linearization apparatus for linear automatic gain control of FIG. 2 can commonly serve as the transmission amplifier linearizer 110, the power amplifier linearizer 112, the low noise amplifier linearizer 108 and the reception amplifier linearizer 109. For the sake of convenience, however, the linearization apparatus will be described on the assumption that it serves as the low noise amplifier linearizer 108.

Referring to FIG. 2, when a received RF signal is applied to the low noise amplifier 101, the main controller provides the low noise amplifier linearizer 108 with a low noise amplifier automatic gain control signal, or an input level automatic gain control signal corresponding to a power level of the signal applied to the low noise amplifier 101. Here, the input level automatic gain control signal means the automatic gain control signals provided to the respective linearizers from the main controller as described in conjunction with FIG. 1, i.e., the low noise amplifier automatic gain control signal provided to the low noise amplifier linearizer 108, the reception amplifier automatic gain control signal provided to the reception amplifier linearizer 109, the transmission amplifier automatic gain control signal provided to the transmission amplifier linearizer 110, and the power amplifier automatic gain control signal provided to the power amplifier linearizer 112.

The input level automatic gain control signal, or the low noise amplifier automatic gain control signal is comprised of a predetermined number of bits, wherein the first b bits among the predetermined number of bits represent a specific entry region and the remaining bits except the first b bits represent a corresponding position in the entry region. The number of entries becomes $2^b$=k. It is assumed in FIG. 2 that the low noise amplifier automatic gain control signal is comprised of 8 bits and b=4. Since the first 4 bits represent an entry region, the number of entries becomes k=$2^b$=16, and the last 4 bits represent an actual position value of a corresponding entry region. Further, an initial value is set in a first position in each of the k entry regions. Here, the "initial value" becomes a position value of a first position in each of the k entry regions given by dividing the n input levels.

Upon receiving the low noise amplifier automatic gain control signal, a controller (not shown) detects an entry region represented by the first 4 bits of the 8-bit low noise amplifier automatic gain control signal, and detects an actual position in the detected entry region, represented by the last 4 bits of the 8-bit low noise amplifier automatic gain control signal. Further, the controller detects an initial value corresponding to the detected entry region by reading an initial value table stored in an initial value table storage 200 based on the detected entry region, and detects a slope character value corresponding to the detected entry region by reading a slope character table stored in a slope character table storage 201 based on the detected entry region. The initial value table storage 200 and the slope character table storage 201 are realized with a RAM (Random Access Memory). The initial value table stores initial values for the k entry regions, and the slope character table stores slope character values for the k entry regions.

Under the control of the controller, the initial value table storage 200 provides an initial value of a corresponding entry region to an adder 203, and the slope character table storage 201 provides a slope character value of a corresponding entry region to a multiplier 202. The multiplier 202 multiplies a slope value output from the slope table character storage 201 by the last 4 bits (or a corresponding position value) of an input level automatic gain control signal, i.e., the low noise amplifier automatic gain control signal, and provides its output to a resolution determiner 204. Here, the input level automatic gain control signal may have n input levels.

The resolution determiner 204 obtains a multiplied value of a slope value of the detected entry region and a position value of the detected entry region by dividing the output signal of the multiplier 202 by a resolution constant "c" and provides the multiplied value to the adder 203. Here, the resolution constant "c" used to determine the resolution is generated depending on a slope character value register for storing the slope character value. The adder 203 adds an initial value output from the initial value table storage 200 to an output signal of the resolution determiner 204, and generates an output level automatic gain control signal, or the third linear automatic gain control signal. The output level automatic gain control signal generated from the adder 203 may have m output levels.

An operation algorithm of the linearization apparatus for linear automatic gain control illustrated in FIG. 2 can be expressed as $$Y(i,j)=O[i]+(S[i]/c*j) \quad (1)$$

where, Y(i,j): an output level automatic gain control signal i: a value $\{0, 1, 2, \ldots, (k-1)\}$ of first b bits of an input level automatic gain control signal j: a value $\{0, 1, 2, \ldots, (n/k-1)\}$ of the remaining bits except the first b bits of the input level automatic gain control signal k: the number of entries ($k=2^b$)

c: a resolution constant for determining a slope value (the resolution constant is related to the number of output bits of a slope character value register)

O: an initial value register (the number of output bits of which is determined based on a value of m)

S: a slope character value register (the number of output bits of which is determined based on a value of c)

n: the maximum number of input levels of the input level automatic gain control signal m: the maximum number of output levels of the output level automatic gain control signal.

The operation algorithm of the linearization apparatus for linear automatic gain control illustrated in FIG. 2, stores an initial value in each of the k entries generated by dividing n input levels at intervals of n/k, and connects the initial values in a straight line with a slope value determined by dividing a slope character value of the corresponding entry region by the resolution constant "c." Such an algorithm contributes to a reduction in complexity of a circuit structure and an amount of data to be stored, compared with the lookup table.

With the rapid development of a mobile communication technology, many studies have been carried out on various standard specifications supporting the mobile communication system, and each country adopts a proper standard specification according to its radio environment. For example, an IMT-2000 (International Mobile Telecommunication-2000) system, a $3^{rd}$ generation mobile communication system, is divided into WCDMA (Wideband Code Division Multiple Access) standard specification led by the European Community and Japan, CDMA2000 (Code Division Multiple Access 2000) standard specification led by the United States, and TD-SCDMA (Time Division-Synchronous Code Division Multiple Access) standard specification led by China.

The standard specifications define a plurality of channels according to their communication modes. For example, in a CDMA digital mode, 20 channels are assigned. If the mobile communication terminal uses the linear automatic gain control apparatus in the CDMA digital mode, it must store information on linear gain characteristics of the 20 channels in corresponding RAM tables. The linear gain characteristic information of the 20 channels is stored in an EEPROM (Electrically Erasable and Programmable Read Only Memory) of the mobile communication terminal, and the linear automatic gain control apparatus reads the information stored in the EEPROM according to circumstances, thus requiring an increased memory capacity. In the $3^{rd}$ mobile communication system, since the standard specifications assign more channels than that of the CDMA digital mode, as many RAM tables as the number of the channels must be provided, thus causing an increase in the required size of the EEPROM. Particularly, in the mobile communication terminal not only the EEPROM but also the RAM included in the linearization apparatus for the linear automatic gain control, increase in their size undesirably.

SUMMARY OF THE INVENTION

It is, therefore, an object of the present invention to provide a linearization apparatus and method for linear automatic gain control, adapted to minimize a required memory size.

To achieve the above and other objects, the present invention provides a linearization apparatus in a mobile communication terminal wherein automatic gain control signals are divided into a plurality of entry regions, the apparatus including an initial value for a first entry region among the plurality of entry regions, a resolution value and a slope character value for each entry region for generating a linear automatic gain control signal which guarantee a linearity of amplification gain of an amplifier. The linearization apparatus comprises a controller for detecting a corresponding entry region using a preset number of bits from the automatic gain control signal which is represented by a plurality of bits and detecting a position value of the detected entry region using the remaining bits except the preset number of bits; an initial value generator for generating an initial value of a second entry region, under control of the controller, using the initial value of the first entry region, an entry region size value, a slope value of the first entry region presented by the resolution value, a slope character value of the first entry region, and then sequentially generating initial values of the following entry regions using an initial value of a previous entry region, the entry region size value, a slope value of a previous entry region to thereby generate an initial value of the detected entry region; a linearizer for generating the linear automatic gain control signal by adding a value obtained by multiplying the slope value of the detected entry region by the position value of the entry region and an initial value of a corresponding entry region which is generated by the initial value generator.

To achieve the above and other objects, the present invention provides a linearization method in a mobile communication terminal wherein automatic gain control signals are divided into a plurality of entry regions, and which includes an initial value for a first entry region among the plurality of entry regions, a resolution value and a slope character value for each entry region for generating a linear automatic gain control signal which guarantee a linearity of amplification gain an amplifier. The linearization method comprising the steps of: detecting a corresponding entry region using a preset number of bits from the automatic gain control signal which is represented by a plurality of bits and detecting a position value of the detected entry region using the remaining bits except the preset number of bits; generating an initial value of a second entry region using the initial value of the first entry region, an entry region size value, a slope value of the first entry region presented by the resolution value and a slope character value of the first entry region, and then sequentially generating initial values of the following entry regions using an initial value of a previous entry region, the entry region size value, a slope value of a previous entry region to thereby generate an initial value of the detected entry region; and generating the linear automatic gain control signal by adding a value obtained by multiplying the slope value of the detected entry region by the position value of the entry region and an initial value of a corresponding entry region which is generated by the initial value generator.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 3:
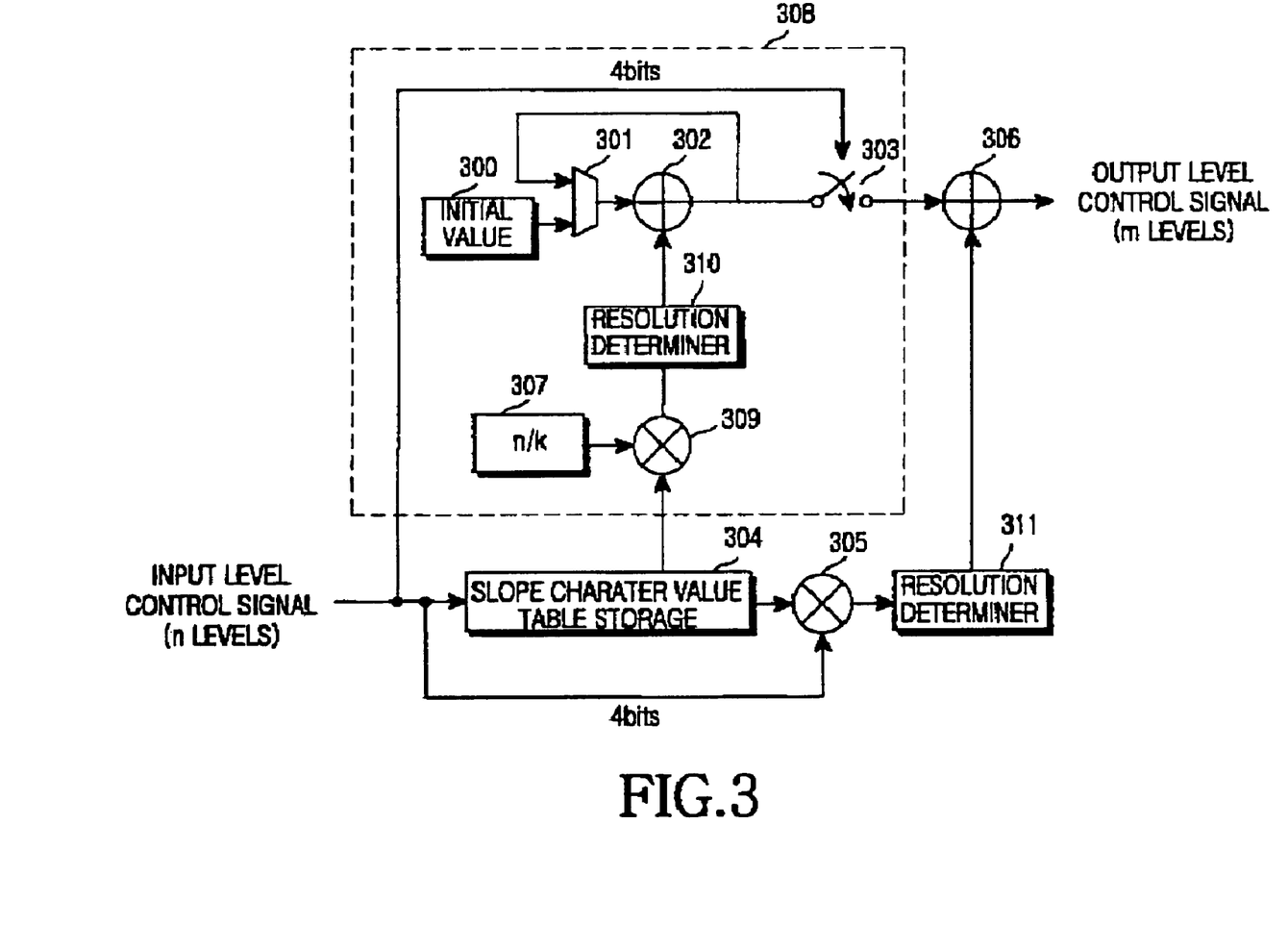
FIG. 3 is a block diagram illustrating an internal structure of a linearization apparatus for linear automatic gain control according to an embodiment of the present invention.

FIG. 3 is a block diagram illustrating an internal structure of a linearization apparatus for linear automatic gain control according to an embodiment of the present invention.

Before a description of FIG. 3, it should be noted that the linearization apparatus for linear automatic gain control can commonly serve as the transmission amplifier linearizer 110, the power amplifier linearizer 112, the low noise amplifier linearizer amplifier 108 and the reception amplifier linearizer 109 in the transceiver of the mobile communication terminal illustrated in FIG. 1. However, the linearization apparatus receives and generates different input level automatic control signals and output level automatic control signals according to the linearizers to which the linearization apparatus is applied. The input level automatic gain control signals include automatic gain control signals provided from the main controller of the mobile communication terminal to the respective linearizers, i.e., a low noise amplifier automatic gain control signal is provided to the low noise amplifier linearizer 108, a reception amplifier automatic gain control signal is provided to the reception amplifier linearizer 109, a transmission amplifier automatic gain control signal is provided to the transmission amplifier linearizer 110, and a power amplifier automatic gain control signal is provided to the power amplifier linearizer 112. Further, the output level automatic gain control signals include a first linear automatic gain control signal output from the transmission amplifier linearizer 110, a second linear automatic gain control signal output from the power amplifier linearizer 112, a third linear automatic gain control signal output from the low noise amplifier linearizer 108, and a fourth linear automatic gain control signal output from the reception amplifier linearizer 109.

Like the linearization apparatus of FIG. 2, the linearization apparatus of FIG. 3 also generates k entry regions by dividing n input levels of the input level automatic gain control signal by a preset number, e.g., n/k, and provides k entries each corresponding to the k entry regions, instead of providing n entries each corresponding to the n input levels. The linearization apparatus also stores slope character values in a table in association with the k entries, as described in conjunction with FIG. 2.

Now, the linearization apparatus for linear automatic gain control illustrated in FIG. 3 will be described on the assumption that the linearization apparatus serves as the low noise amplifier linearizer 108.

Referring to FIG. 1, if a main controller of the mobile communication terminal perceives that a signal is applied to the low noise amplifier 101, the main controller provides the low noise amplifier linearizer 108 with a low noise amplifier automatic gain control signal, or an input level automatic gain control signal corresponding to a power level of the signal applied to the low noise amplifier 101. Here, the input level automatic gain control signal means automatic gain control signals provided from the main controller to the respective linearizers in FIG. 1, i.e., the low noise amplifier automatic gain control signal provided to the low noise amplifier linearizer 108, the reception amplifier automatic gain control signal provided to the reception amplifier linearizer 109, the transmission amplifier automatic gain control signal provided to the transmission amplifier linearizer 110, and the power amplifier automatic gain control signal provided to the power amplifier linearizer 112.

The input level automatic gain control signal, or the low noise amplifier automatic gain control signal is comprised a predetermined number of bits, wherein first b bits among the predetermined number of bits represent one of the $k=2^b$ entry regions and the remaining bits excepting the first b bits represent a given position in the corresponding entry region. It is assumed herein that the low noise amplifier automatic gain control signal is comprised 8 bits and b=4. Since the first 4 bits represent an entry region, the number of entries becomes $k=2^b=16$, and the last 4 bits represent an actual position in the corresponding entry region. Further, an initial value is set in a first position in any one (a first entry region in the embodiment) of the k entry regions. Here, the "initial value" becomes a position value of a first position in a certain one of the k entry regions given.

Upon receiving the low noise amplifier automatic gain control signal, a controller (not shown) detects an entry region represented by the first 4 bits of the 8-bit low noise amplifier automatic gain control signal, and detects an actual position in the detected entry region, represented by the last 4 bits of the 8-bit low noise amplifier automatic gain control signal. Further, the controller detects a slope character value corresponding to the detected entry region by reading a slope character value table stored in a slope character value table storage 304 based on the detected entry region. Here, the slope character value table storage 304 is realized with a RAM, and the slope character value table stores slope character values for the k entry regions.

The controller provides the initial value by the register 300 And, the controller sequentially controls that a slope character value table 304 provides the multiplier 309 with a slope character value according to entry region, wherein the slope values is from a slope character value of an entry region where the predetermined initial value exists up to that of the detected entry region.

The multiplier 309 then multiplies a slope character value of the entry region where the initial value exists by a size 307, n/k, of the entry region, and provides its output to a resolution determiner 310. The resolution determiner 310 obtains a multiplied value of a slope value of the detected entry region and a position value of the detected entry region by dividing the output signal of the multiplier 309 by a resolution constant "c" and provides its output to an adder 302. Here, the resolution constant "c" for determining the slope value is generated depending on a register for storing the slope character value. The adder 302 adds the output value of the resolution determiner 310 to an output signal of a selector 301.

The selector 301 selects the initial value 300 or the output signal of the adder 302, and provides the selected value to the adder 302. The selector 301, under the control of the controller, initially selects the initial value 300, and subsequently, selects the output value of the adder 302, and feeds back the selected value to the adder 302. The adder 302 adds the output value of the selector 301 to the output value of the resolution determiner 310, and provides its output to a selector 303. The selector 303 is also controlled by the controller. When the initial value generator 308 finally ends initial value generation, i.e., ends initial value generator over the detected entry region, the selector 303 selects the output signal of the adder 302 and provides the selected value to the adder 306.

If the initial value generator 308 operates on the slope character value for the first entry region where the initial value exists initially, the adder 302 adds the initial value output from the selector 301 to a multiplied value of a slope value of the first entry region and a position value of the first entry region output from the resolution determiner 310, thereby detecting a initial value of an entry region following the first entry region.

If the initial value generator 308 operates for the entry region where the initial value exists initially, the initial value generator 308 generates a initial value of the entry region following the first entry region. If the initial value generator 308 performs the above operations using a slope character value of the next entry region, the initial value generator 308 generates a initial value for the entry region subsequent to the next entry region. In this manner, the initial value generator 308 generates a initial value of an entry region represented by the first 4 bits of the low noise amplifier automatic gain control signal by performing the initial value generating operation on the slope character value up to the entry region prior to that represented by the first 4 bits.

The initial value generator 308 provides the detected initial value of the entry region represented by the first 4 bits of the low noise amplifier automatic gain control signal, to the adder 306. Meanwhile, the controller controls the slope character value table storage 304 to provide a multiplier 305 with a slope character value of the entry region represented by the first 4 bits. The multiplier 305 then multiplies the slope character value output from the slope character value table storage 304 by a corresponding position value represented by the last 4 bits of the low noise amplifier automatic gain control signal, and provides its output to a resolution determiner 311.

The resolution determiner 311 obtains a multiplied value of a slope value of the detected entry region and a position value of the entry region represented by the first 4 bits of the low noise amplifier automatic gain control signal by dividing the output signal of the multiplier 305 by the resolution constant "c" and then provides its output to the adder 306. Here, the resolution constant "c" is generated depending on a register for storing the slope character value, as described in conjunction with the resolution determiner 310. The adder 306 adds the initial value of the entry region represented by the first 4 bits of the low noise amplifier automatic gain control signal, output from the selector 303, to the output value of the resolution determiner 311, and generates its output as an output level automatic gain control signal, or the third linear automatic gain control signal.

An operation algorithm of the linearization apparatus for linear automatic gain control illustrated in FIG. 3 can be expressed as $$Y(i, j) = a + \sum_{L=0}^{i-1} (S[L]/c * (n/k)) + (S[i]/c * j) \quad (2)$$

where, Y(i,j): an output level automatic gain control signal i: a value $\{0, 1, 2, \ldots, (k-1)\}$ of first b bits of an input level automatic gain control signal j: a value $\{0, 1, 2, \ldots, (n/k-1)\}$ of the remaining bits excepting the first b bits of the input level automatic gain control signal k: the number of entries ($k=2^b$)

a: an initial value (for n=0)

c: a resolution constant for determining a slope value (the resolution constant is related to the number of output bits of a slope character value register)

S: a slope character value register (the number of output bits of which is determined based on a value of c)

n: the maximum number of input levels of the input level automatic gain control signal m: the maximum number of output levels of the output level automatic gain control signal.

The operation algorithm of the linearization apparatus for linear automatic gain control illustrated in FIG. 3, stores slope character values of k entries generated by dividing n input levels of the input level automatic gain control signal, or the low noise amplifier automatic gain control signal, at intervals of n/k, and connects the k entry regions in a straight line with a slope value determined by dividing a slope character value by the resolution constant "c" on the basis of the initial value 300 from the input level 0, thereby detecting a initial value. That is, the algorithm generates initial value of the present entry region with the initial value of the first entry region represented by the first 4 bits of the low noise amplifier automatic gain control signal and the slope values of previous entry regions calculated by the slope values of previous entry regions and the resolution constant "c", And then connects k entry regions in a straight line with the generated initial values and the slope values.

Meanwhile, in order to generate an output level automatic gain control signal for a corresponding position in a corresponding entry region using an initial value and a slope character value without storing initial values of the respective entries, it is necessary to read a slope character value RAM as many times as the number of entry regions due to sequential calculations and accumulations, thus increasing a required time. However, since an automatic gain control process operates at stated periods due to an oscillation factor and the PDM output signal controls an external analog device, it should be updated after a lapse of a preset time. Therefore, in operation, the linearization apparatus for automatic gain control has a sufficient time margin, so the required time increasing problem due to the calculations does not create a delay.

Next, a relationship between an input level automatic gain control signal and an output level automatic gain control signal in a linearization apparatus for linear automatic gain control illustrated in FIG. 3 will be described with reference to FIG. 4.

Figure 4:
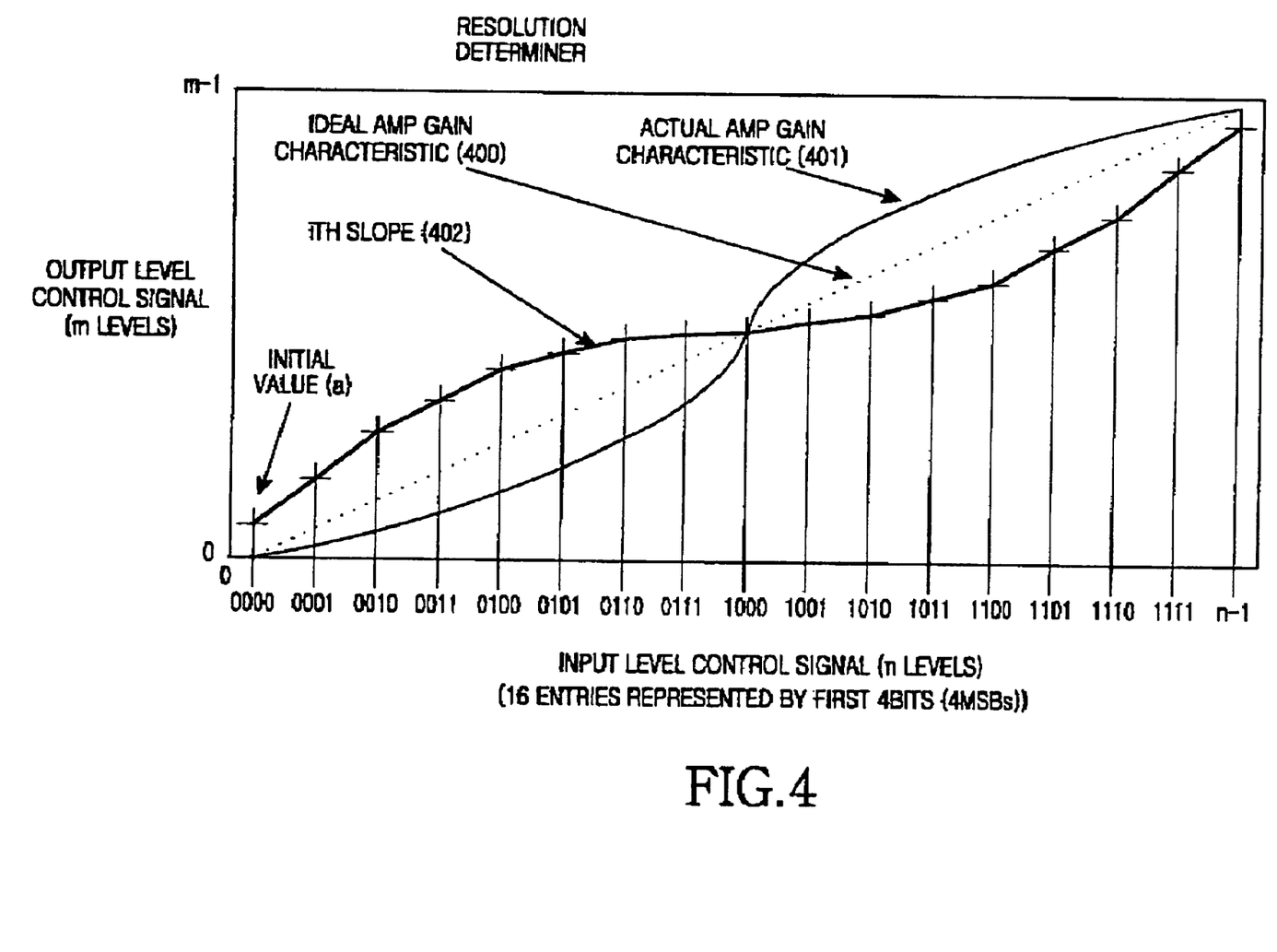
FIG. 4 is a graph illustrating characteristic curves of the linearization apparatus for linear automatic gain control illustrated in FIG. 3.

FIG. 4 is a graph illustrating characteristic curves of the linearization apparatus for linear automatic gain control illustrated in FIG. 3. Referring to FIG. 4, an x-axis represents an input level automatic gain control signal having n input levels, and a y-axis represents an output level automatic gain control signal having m output levels. The initial value described in conjunction with FIG. 3, or a initial value of the first entry region among k entries generated by dividing the n input levels at intervals of n/k, is represented by "a." If the initial value "a" is given, it is possible to calculate a initial value of the next entry region using a slope value determined by dividing the slope character value by the resolution constant "c" based on the initial value "a" as described in conjunction with FIG. 3, instead of storing initial values for the k entry regions. As a result, it is not necessary to separately store initial values for the k entry regions, thus reducing a memory size needed to store the initial values.

In addition, the linear automatic gain control apparatus performs an operation of linearly increasing an output level of the signal output from the amplifier with respect to a fixed-level input signal as an input automatic gain control signal of the amplifier increases, as illustrated in FIG. 4, i.e., an operation of realizing an ideal gain characteristic 400 of FIG. 4. An actual gain characteristic curve 401 of the amplifiers, i.e., the low noise amplifier 101, the reception amplifier 102, the transmission amplifier 105 and the power amplifier 106 of FIG. 1, is not linear in terms of a ratio of the input automatic gain control signal to the output automatic gain control signal. Therefore, the linearization apparatus for linear automatic gain control intentionally alters the input automatic gain control signal applied to the amplifier and generates the altered output automatic gain control signal having the gain characteristic curve 402. As a result, an actual gain characteristic curve 401 of the amplifier is canceled by the gain characteristic curve 402 of the linearization apparatus for linear automatic gain control, thereby realizing the ideal gain characteristic curve 400.

As described above, the present invention can minimize a required memory capacity of the linearization apparatus for linear automatic gain control used to linearly control characteristics of the amplifiers in the transceiver of the mobile communication terminal. The reduction in the memory capacity contributes to a decrease in hardware size of the mobile communication terminal and an increase in efficiency of hardware resources. In addition, the reduction in the memory capacity contributes to a decrease in the cost of the mobile communication terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A linearization apparatus in a mobile communication terminal wherein automatic gain control signals are divided into a plurality of entry regions, the apparatus including an initial value for a first entry region among the plurality of entry regions, a resolution constant and a slope character value for each entry region for generating a linear automatic gain control signal which provide a linearity of amplification gain of an amplifier, the linearization apparatus comprising:

a controller for detecting a corresponding entry region using a preset number of bits from the automatic gain control signal which is represented by a plurality of bits and detecting a position value of the detected entry region using the remaining bits except the preset number of bits;

an initial value generator for generating an initial value of a second entry region, under control of the controller, using the initial value of the first entry region, an entry region size value and a slope value of the first entry region presented by the resolution constant and a slope character value of the first entry region, and then sequentially generating initial values of the following entry regions using an initial value of a previous entry region, the entry region size value and a slope value of a previous entry region to thereby generate an initial value of the detected entry region; and a linearizer for generating the linear automatic gain control signal by adding a value obtained by multiplying the slope value of the detected entry region by the position value of the entry region and an initial value of a corresponding entry region which is generated by the initial value generator.

2. The linearization apparatus of claim 1, wherein the initial value of the first entry region is an initial value of an arbitrary entry region among a plurality of entry regions.

3. The linearization apparatus of claim 1, wherein the entry region size value is equal to a value calculated by dividing the number of the automatic gain control signal by the number of the entry region.

4. The linearization apparatus of claim 1, wherein the initial value generator comprises;

a first multiplier for multiplying the slope character value by the entry region size value, a first resolution determiner for operating on output value of the first multiplier and the resolution constant, and an adder for adding output value of the first resolution determiner and the initial value, wherein a value calculated by multiplying a slope value of a current entry region by the entry region size value is added to an initial value of the current entry region to thereby output the added one as an initial value of the next entry region.

5. The linearization apparatus of claim 1, wherein the linearizer comprises;

a second multiplier for multiplying a slope character value of the detected entry region by a corresponding position value of the detected entry region, a second resolution determiner for operating on output value of the second multiplier and the resolution constant to output it as a multiplied value of a slope value of the detected entry region and a position value of the detected entry region, and an adder for adding the output value of the second resolution determiner and an initial value of the detected entry region to generate the linear automatic gain control signal.

6. A linearization apparatus of claim 1, wherein the linearizer is applied to each of a low noise amplifier, a power amplifier, a reception amplifier and a transmission amplifier.

7. A linearization method in a mobile communication terminal wherein automatic gain control signals are divided into a plurality of entry regions, and which includes an initial value for a first entry region among the plurality of entry regions, a resolution constant and a slope character value for each entry region for generating a linear automatic gain control signal which provide a linearity of amplification gain of an amplifier, the linearization method comprising the steps of:

detecting a corresponding entry region using a preset number of bits from the automatic gain control signal which is represented by a plurality of bits and detecting a position value of the detected entry region using the remaining bits except the preset number of bits;

generating an initial value of a second entry region using the initial value of the first entry region, an entry region size value and a slope value of the first entry region presented by the resolution constant and a slope character value of the first entry region, and then sequentially generating initial values of the following entry regions using an initial value of a previous entry region, the entry region size value, a slope value of a previous entry region to thereby generate an initial value of the detected entry region; and generating the linear automatic gain control signal by adding a value obtained by multiplying the slope value of the detected entry region by the position value of the entry region and an initial value of a corresponding entry region which is generated by the initial value generating step.

8. The linearization method of claim 7, wherein the initial value of the first entry region is an initial value of an arbitrary entry region among a plurality of entry regions.

9. The linearization method of claim 7, wherein the entry region size value is equal to a value calculated by dividing the number of the automatic gain control signal by the number of the entry region.

10. The linearization method of claim 7, wherein the step of generating the initial value comprises the steps of;

multiplying the slope character value by the entry region size value, operating on the multiplied value and the resolution constant, and adding a value obtained by operating the multiplied value and the resolution constant and the initial value, wherein a value calculated by multiplying a slope value of a current entry region by the entry region size value is added to an initial value of the current entry region to thereby output the added one as an initial value of the next entry region.

11. The linearization method of claim 7, wherein the step of generating the linear automatic gain control signal comprises the step of;

multiplying a slope character value of the detected entry region by a corresponding position value of the detected entry region, operating on the multiplied one and the resolution constant to output it as a value obtained by multiplying the slope value of the detected entry region by the position value of the entry region, and adding the slope value and an initial value of the detected entry region to generate the linear automatic gain control signal.

12. The linearization method of claim 7, wherein the linearization is applied to each of a low noise amplifier, a power amplifier, a reception amplifier and a transmission amplifier.

* * * * *